UNITED STATES PATENT OFFICE.

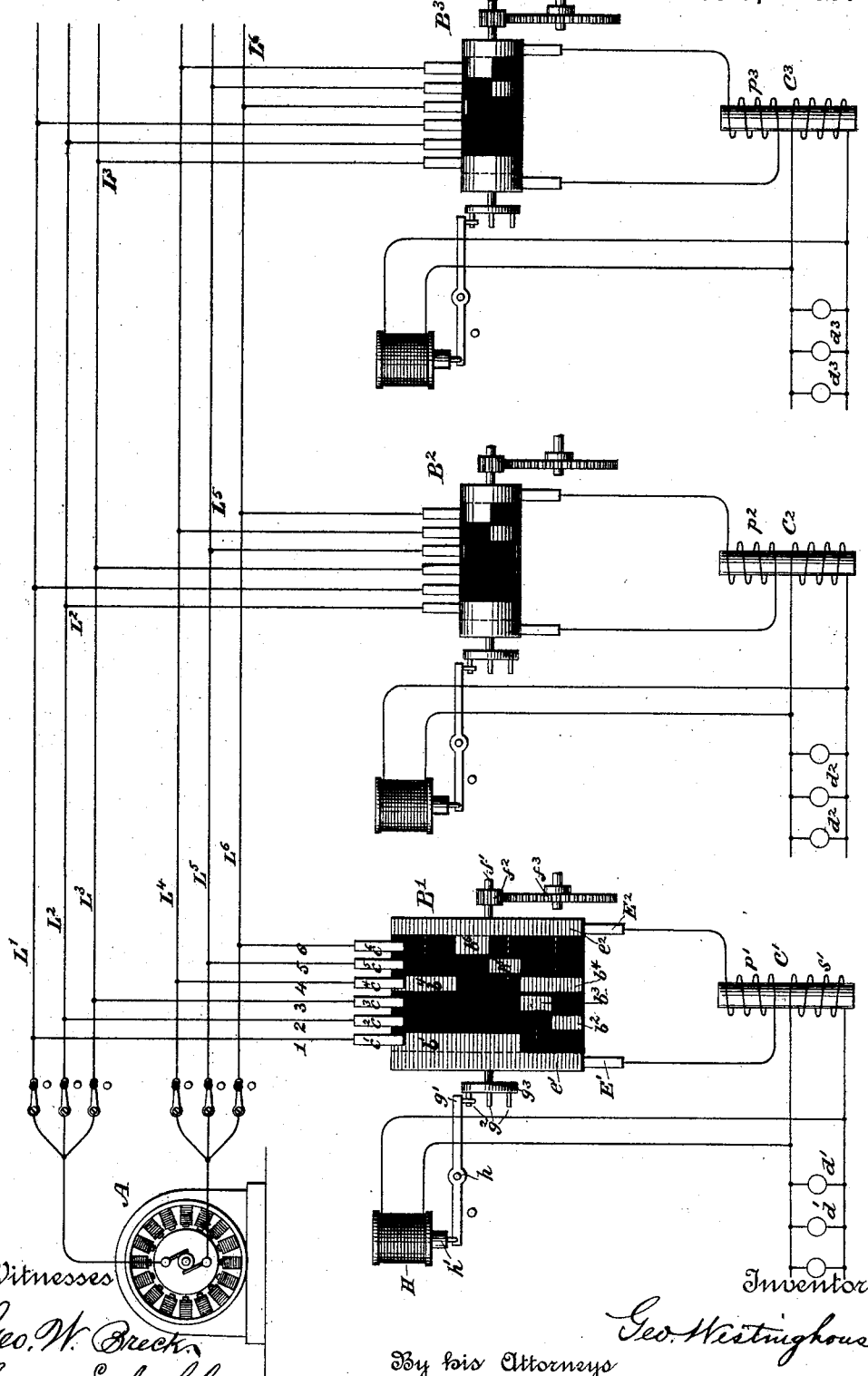

GEORGE WESTINGHOUSE, JR., OF PITTSBURG, PENNSYLVANIA.

AUTOMATIC CIRCUIT-CONTROLLING APPARATUS FOR SYSTEMS OF ELECTRICAL DISTRIBUTION.

SPECIFICATION forming part of Letters Patent No. 373,036, dated November 8, 1887.

Application filed March 9, 1887. Serial No. 230,188. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful Improvements in Automatic Circuit-Controlling Apparatus for Systems of Electrical Distribution, of which the following is a specification.

The invention relates to a method of and an apparatus for interchanging the connections of electric circuits employed for supplying translating devices, so that in case one of the main lines is accidentally interrupted the apparatus normally connected therewith will be automatically placed in connection with another line.

The invention will be described in connection with the accompanying drawing, which illustrates in diagram a system of circuits and the apparatus employed for controlling the circuit-connections.

Referring to the drawing, A represents a source of alternate, intermittent, or pulsatory currents designed to be employed for operating translating devices $d'\ d'$, $d^2\ d^2$, and $d^3\ d^3$. The translating devices $d'\ d'$ are connected in the circuit of the secondary coil $s'$ of the converter C'. The primary coil $p'$ of this converter is placed in connection with the opposite poles of the generator A by means of conductors L' and L$^4$, respectively, derived from said poles.

The converter C$^2$ has its primary coil $p^2$ connected between the lines L$^2$ and L$^5$, likewise derived from the poles of the generator A, and the converter C$^3$ has its primary coil $p^3$ in like manner connected in circuit between the lines L$^3$ and L$^6$.

The method of securing the connections and interchanging them will be described in connection with apparatus connected with the converter C'. The circuit-controlling device B' (shown as projected into a plane) and the devices B$^2$ and B$^3$ (shown as cylindrical in form) are employed for controlling the normal connections of the primary coils of the converters. If the line L', for instance, should become broken, it would be desirable to substitute therefor some other conductor, L$^2$ or L$^3$. For this purpose the conductor L' is connected by a conductor, 1, with the brush $c'$, applied to a contact-plate, $b'$, upon the cylinder B'. The line L$^2$ is connected by the conductor 2 with the brush $c^2$, placed in a different longitudinal position from the brush $c'$ and bearing against the cylinder B'. This brush $c^2$ is designed to make contact with a plate, $b^2$, at a certain point in the revolution of the cylinder B'. A third brush, $c^3$, applied to a plate, $b^3$, which is located in a different angular position upon the cylinder from the other two plates, is connected by the conductor 3 with the line L$^3$. The lines L', L$^2$, and L$^3$ are all connected together and with one pole of the generator A. The lines L$^4$ L$^5$ L$^6$ are derived from the other pole, and these latter lines are respectively connected by the conductors 4, 5, and 6 with the brushes $c^4\ c^5\ c^6$. The last-named brushes are provided with the contact-plates $b^4\ b^5\ b^6$, similar to the contact-plates $b'\ b^2\ b^3$. The plates $b'\ b^2\ b^3$ are electrically connected with a contact-ring, $e'$, and the points $b^4\ b^5\ b^6$ are similarly connected with the contact-ring $e^2$. Two contact-brushes, E' and E$^2$, respectively, rest against these rings and at all times make contact therewith. These brushes are connected through the primary coil $p'$ of the converter C'.

The normal connections of the lines L' and L$^4$ are therefore as follows: Through the conductor 1, brush $c'$, ring $e'$, coil $p'$, ring $e^2$, contact-plate $b^4$, brush $c^4$, and the conductor 4. If, now, the conductor L' should become interrupted between the point at which the conductor 1 is connected with the line L' and the point where the several lines unite, then it is desired to connect the brush E' in circuit with one of the other lines, L$^2$ or L$^3$, and to thereby complete the connections of the primary coil of the converter. For this purpose the cylinder B' must be revolved, and the manner of releasing it is as follows: The axis $f'$ of the cylinder is provided with a pinion, $f^2$, driven slowly by a train of gear, $f^3$, or in any suitable manner. Normally, however, the cylinder is prevented from revolving by reason of a detent, $g'$, engaging a pin, $g^2$, carried upon a disk, $g^3$, which is supported upon the axis $f'$. This detent is carried upon the lever $h$ of an electro-magnet or solenoid, H. When the coils of this solenoid are traversed by a current of electricity, then the core $h'$ will be held up, as shown in the drawing, causing the detent to stand in the path of the pin. If, however, the current ceases, the core will be dropped and the detent moved from the path of the pin, thereby allowing the cylinder to revolve in response to the force of the driving-train $f^3$. It is necessary, therefore, that the solenoid H be connected in some circuit which will be supplied with currents only when the circuit-connections with the brushes $E'$ and $E^2$ are completed. For this purpose a desirable plan is to connect the terminals of the solenoid between the terminals of the secondary coil $s'$ of the converter, although they might in certain instances be connected between the terminals of the primary coil. It will be understood, therefore, that if the line $L'$ is interrupted the cylinder will commence to revolve at a slow regulated speed, the plate $b'$ will pass from the end of the brush $c'$, and the plate $b^2$ will come in contact with the brush $c^2$, thus connecting the line $L^2$ with the brush $E'$. The circuit-connections are then complete, through the coil $p'$, from the line $L^2$ to the line $L^4$, and if both these lines are supplied with currents then the solenoid will be immediately vitalized and the detent $g'$ will be thrust into the path of another pin, $g^2$, and stop the cylinder, with the brush $c^2$ in contact with the plate $b^2$. If, however, the line $L^2$ were incomplete, the solenoid would still remain unvitalized, and the plate $b^2$ would be carried from beneath the brush $c^2$, while the plate $b^3$ would be placed in connection with the brush $c^3$, and thus with the line $L^3$.

It might chance that the lines $L^4$ and $L^5$ were defective. Then the cylinder would be released by reason of the interruption of the circuit and the cylinder would revolve in the manner described until the connections of the line $L^4$ with the several lines $L'$, $L^2$, and $L^3$ had first been tested, and still their circuit would not be completed with the generator. Therefore, upon the further revolution of the cylinder, the brush $c'$ would be restored to its place $b^2$, and at that moment the plate $b^4$ would pass from beneath the brush $c^4$ and the brush $c^5$ would touch against the plate $b^5$. Still, if the line $L^5$ were interrupted, the circuit would not yet be complete and the cylinder would revolve, carrying the plate $b^6$ into contact with the brush $c^6$ and thus connecting it with the line $L^6$. The circuit would then be complete from the line $L'$, through the primary coil $p'$ and by way of the brush $c^6$ to the line $L^6$.

The devices $B^2$ and $B^3$ are similar in construction and operation; but it should be observed that the normal connections of the devices $B^2$ are such that the circuit of the primary coil $p^2$ is from the line $L^2$ to the line $L^5$, while the device $B^3$ normally serves to connect the coil $p^3$ between the lines $L^3$ and $L^6$. The circuit-connections will be evident from the diagram without description.

I claim as my invention—

1. The combination, with a source of electricity and multiple mains leading therefrom, of a series of converters normally connected between pairs of said mains, and an automatic circuit-controlling device for interchanging the connections of said converters.

2. The combination, with a source of electricity and multiple mains leading therefrom, of automatic circuit-controlling devices set in operation by the interruption of one of the mains connected therewith, substantially as described.

3. The combination, with a source of electricity and multiple mains leading from the respective poles thereof, of a series of converters respectively connected between different pairs of said mains, and a circuit-controlling device through which the connections of each converter are normally completed, and a retaining device for each controller operated by currents through the converter, substantially as described.

4. A circuit-controlling device for electric circuits, consisting of a revolving cylinder, a detent therefor, an electric converter, and a solenoid in the circuit of the converter acting upon said detent.

5. The combination of an electric converter, a pair of supply-conductors divided into multiple main lines for delivering currents thereto, and an automatic circuit-controlling device successively placing the different lines of said pair in circuit with the primary coil of the converter.

6. The combination, with an electric converter and a pair of supply-conductors divided into multiple main lines for delivering currents thereto, of an automatic circuit-controlling device successively placing the different lines of said pair in circuit with the primary coil of the converter, and a retaining and releasing device causing such controller to operate upon the interruption of the circuit.

In testimony whereof I have hereunto subscribed my name this 4th day of March, A. D. 1887.

GEO. WESTINGHOUSE, JR.

Witnesses:
DANL. W. EDGECOMB,
CHARLES A. TERRY.